3,383,056
METHOD FOR DISINTEGRATING POROUS SOLIDS

Leonard C. Drake, Wenonah, N.J., assignor to Mobil Oil Corporation, a corporation of New York
No Drawing. Filed Feb. 7, 1966, Ser. No. 525,362
10 Claims. (Cl. 241—1)

This invention relates to a process for producing subdivided solid porous particles of small size from solid porous granules of considerably larger size.

The process is advantageous in making available, generally without the use of grinding equipment, fluid size particles, i.e., particles of such small size that they may be fluidized by appropriate use of a fluidizing gas. The process is also useful for the preparation of various sols of diverse utility. Other advantages will become apparent from the ensuing description.

In essence, the process comprises mixing the solid porous granules to be subdivided with a crystallizable liquid, as hereinafter defined, to occlude an amount of the liquid in the pores and capillaries of the granules. The latter are then separated from excess liquid and cooled to a temperature below the freezing point of the liquid so that the occluded liquid crystallizes in the said pores and capillaries. Then the granules are brought in contact with a second liquid at a temperature below the said freezing point, and during such contact it is found that the granules are subjected to a disintegrating effect which may range from the appearance of cracks in the granules to the complete disruption of the same with formation of particles of fine size. Where particles are formed, they are recovered after first separating therefrom the liquid and the crystals; and where cracked granules comprise the main product, these may be converted to fine particles as by a simple pulverizing step.

Considering the invention in greater detail, the porous material of which the granules are made may be of any chemical composition, organic or inorganic, and may have any utility. It is of course essential that the granules are porous in order that the crystallizable liquid and the second liquid may have access to the interior thereof. Specific solids include silica gel, alumina, silica-alumina, oxides of calcium, barium, nickel, iron, and the like. Gel-type solids are useful, as obtained by drying hydrated oxides such as alumina, silica, titania, zirconia, magnesia and zinc aluminate. Also the zeolites, both natural and synthetic, and including those zeolites which act as molecular sieves having pores of uniform and generally very small size, say about 5 to 20 Angstroms. Ion exchange forms of zeolites are suitable. Other solids are siliceous earths such as diatomaceous earth, infusorial earth and kieselguhr; natural clays and clay-like materials such as kaolin and montomorillonite clays, bentonite, fuller's earth, Superfiltrol, bauxite and Porocel; porous ceramic materials such as unglazed porcelain; aluminum silicate selective adsorbments such as calcium aluminum silicate; chamotte; asbestos; pumice; talc; activated carbon, bone char, charcoal, graphite; hydrosilicates, particularly those of aluminum. In general, the solid is an inorganic material, this term being employed in a sense sufficiently broad to cover activated carbon, graphite, charcoal and bone chars which are essentially carbon, even though in some cases they may contain small amounts of hydrogen, oxygen, and other chemicals.

The preferred solids are inorganic, highly porous, and have a surface area greater than 50 square meters per gram. More generally, the surface area may vary from 1 square meter per gram to any desired upper limit; usually it may range from 1 to 700, and preferably from 50 to 300 or 400 square meters per gram. As is known, these high surface areas are the result of an internal effect, rather than merely the state of subdivision, and more particularly arise from the presence in the solids of numerous pores or micropores which may have diameters in the range of 3 or 4 Angstroms to 100 microns, preferably 20 Angstroms to 2 or 3 microns. The pore volume is about 5 to 70%, preferably 30 to 50%, of the solids, and usually is greater than 0.2 cc. per gram. Microporous solids are preferred, the term "microporous" referring to porous, solid materials having at least 25% of the total pore volume comprising pores having diameters less than 100 Angstroms.

The preferred porous granules to be treated by the invention are those in which the porosity or microporosity is developed therein by steps comprising controlled precipitation, gellation, drying, and calcining of inorganic hydrous oxides or mixtures of oxides. The hydrous gels resulting from the gellation step may contain foreign particulate matter dispersed therein in finely divided state. After drying and calcining, the gel granules will contain both micropores and macropores. It is found that in granules such as these the porosity tends to be more or less homogeneous. Less preferred are granules, such as compacted tablets or extruded pellets, formed by compressing finer granules, these materials lacking a structural homogeniety, and leading to less preferred results when treated according to the invention.

It is desirable that the granules be as free as possible from moisture. If moisture is present, it may be removed at the outset by heating the granules to a temperature in the range of 200 to 1000° F., or higher, to drive absorbed and/or adsorbed water from the internal pores. Such heating may be done in conjunction with the application of reduced pressure to remove the moisture; or in place of reduced pressure, a flowing stream of inert gas may be employed ot help remove the moisture; or the heating may be done in a stationary atmosphere.

The production of subdivided particles is favored if the starting solids are already in a partially subdivided form, i.e., are available as granules, by which is meant solid material having any suitable shape and having a size suitably in the range of 1 to 25 mm., nominal diameter, preferably 2 to 10 mm.

The crystallizable liquid may be any generally suitable liquid stable at the temperatures employed and having a suitable freezing point, particularly a liquid which freezes in the range of 32 to about 200 or 300° F. or more. More preferably, the freezing point may range from room temperature to just below the boiling point of water. As may be apparent from these temperatures, the liquid may be a molten material at the temperature of use but a solid at room temperature. Many chemicals may satisfy the foregoing requirements, including hydrocarbons, halogenated hydrocarbons, esters, anhydrides, polyhydric alcohols, aromatic alcohols, elements like sulfur and iodine, etc. The hydrocarbons include paraffins, naphthenes, and aromatics, such as n-dodecane, paraffin wax, cyclohexane, benzene, biphenyl, p-xylene, triphenylmethane, naphthalene, etc. Also m-cresol, phenol, nitrobenzene, p-dichlorobenzene, phthalic anhydride, dimethylterephthalate, urea, sulfur iodine, etc. Besides exhibiting the characteristics described, it is preferred that the liquid be a pure or substantially pure compound, have a substantially sharp melting point, contract in volume during cooling, exhibit a substantial volume contraction, say 5 to 20%, on crystallizing, and yield crystals that are fairly hard and brittle.

Suitably the granules are brought in contact with the crystallizable liquid, as by immersion, at a convenient temperature so that they imbibe the liquid until the pores are at least partially or completely filled. The immersion time is variable, but preferably is long enough to permit the granules and the liquid to reach an equilibrium. Then the granules are suitably separated from the excess liquid, as by decantation, filtration, and the like. Prior to any substantial cooling of the impregnated granules, care is taken to remove from the separated granules any liquid adhering to the surfaces thereof, a step which may be readily done by placing the granules on a sheet of adsorbent paper or other adsorbent material and wiping the same therewith; or the wetted granules may be passed over a vibrating screen to dislodge the surface liquid so that it passes through the screen into a collecting reservoir for reuse.

The dried granules are then cooled to a temperature below the freezing point of the occluded liquid so that it crystallizes in the pores of the granules. The required cooling steps are dependent on the freezing point of the particular liquid; thus, if the liquid is a molten wax melting at, say, 138° F., the cooling operation may consist merely in allowing the granules to come to room temperature; while if the freezing point is below room temperature, an ice bath or a Dry Ice bath may be used to supply the desired cooling. As the liquid in the granule pores contracts in volume during cooling and crystallization, some space is thereby provided in the pores for the reception of the above-described second liquid, which may also be designated the disintegrating liquid. The latter is now brought in contact with the granules, preferably by immersion therein of the granules, although any other effective contacting method is suitable.

During immersion, if this is the selected method, the temperature of both the liquid and the granules is maintained below the freezing point of the occluded crystals. The liquid is preferably one having little or no solubility for the crystals, although liquids are useful which have some solvent action on the crystals. In many cases, fragmentation of the granules takes place rapidly, say in less than 0.5 or 1 minute, but times as long as 30 minutes to 1 hour, or even one or two days or more, may be required. Fragmentation also tends to vary with temperature, being more rapid at higher temperatures and vice versa, but the crystals should not be melted. The appearance of the usual fragmentation effect is noteworthy in that the granules, on contact with the described disintegrating liquid, exhibit a mushrooming growth effect, which may be spectacular. A rapid exfoliation of the granules takes place which is unexpected and which suggests use of the same for display or advertising purposes.

If outright fragmentation does not occur, inspection of the granules usually shows that cracks are present in the granule surfaces and are of varying depth. Such cracked granules are significantly weakened such that the application thereto of a modest mechanical crushing force results in their disruption into small particles.

It is thus apparent that the granules undergo a disintegration which may vary from a rapid extensive fragmentation to a weakening of the same characterized by the appearance of cracks.

Suitably the disintegrating liquid may include any compound which is liquid and stable at the temperatures of use. As indicated, the liquid may be a solvent or a non-solvent, preferably the latter, for the crystals. Preferred liquids are water, and liquids similar to it, such as aqueous solutions of salts like sodium chloride and other alkali metal halides, or weak acids like acetic or carbonic, or weak bases like ammonium hydroxide; hydrocarbons such as toluene, cyclohexane; alcohols like methanol, ethanol, isopropanol; polyhydric alcohols like catechol; ketones like acetone, heterocyclic amines like piperidine and pyridine; also compounds like dimethylsulfoxide, triethyl phosphate, turpentine, hexadecane, etc.

The procedure following disintegration, in the case of the fragmented granules, comprises removing the occluded crystals and the liquid from the subdivided particles formed during the fragmentation step. If the liquid is a non-solvent for the crystals, it may be removed by decantation, filtration, solvent extraction, and the like, and this step may be followed by removal of the crystals, which may be done by solvent extraction thereof, or by warming them to melt the same so that decantation or filtration or solvent extraction may be used to effect the separation. Crystals like surfur or iodine, and residual amounts of other crystals, may also be driven off by heating, preferably in the absence of air. By use of a suitable solvent, solvent extraction of both the crystals and the liquid at one and the same time may be feasible. If the disintegrating liquid is a semi-solvent for the crystals, then it is possible to remove both from the subdivided particles as by decantation or filtration. In some cases, as where preparation of a sol is the goal, removal of the crystals and the liquid is not necessary, or even desired; thus, as illustrated in Examples 1 and 5 below, the crystals (wax) and the disintegrating liquid (water) are allowed to remain in the disintegrated mixture, and only the excess fragmented granules are removed, leaving a sol. In other cases, the fragmented granules and the crystals occluded by them may be recovered as a product.

While the invention is not to be limited by any theoretical description of the same, it may be noted as a matter of interest that during cooling of the crystallizable liquid, and particularly during crystallization of the same, it contracts, creating new pores, particularly micropores, and altering other pores in the granules. By subsequently contacting the granules with the disintegrating liquid, these new and altered pores give rise to capillary forces which may act to disrupt the granules, particularly where the crystals are of such hardness as to resist the forces rather than be deformed by them, leaving the latter to act on the granules and to disrupt the same.

In the case of cracked granules, the procedure in the above-described disintegration may be chosen from one or more of the following. In one case, the disintegration may be continued but its course substantially lengthened; thus, in the process described, if a contact time of 1 hour produces only cracked granules, the contact may be allowed to go on for 1 or 2 days, or more, to secure fragmentation. This technique was successful in fragmenting catalyst beads, of the kind described in Example 2 below, where the occluded crystals were cetyl alcohol and the disintegrating liquid was water; very little fragmentation was obtained after about 30 minutes contact of the loaded beads with water at room temperature, but extensive disruption occurred after overnight contact. In a second case, the disintegration step may also be continued, but the temperature of the disintegrating liquid may be raised without, however, exceeding the melting point of the occluded crystals. In a third case, the cracked granules, preferably after removal of the crystals and the disintegrating liquid as by one of the procedures described, are subjected to a mechanical crushing step to produce subdivided particles of the desired size. In view of the weakened condition of the granules, the crushing step can be performed under relatively mild conditions of applied pressure and/or duration.

The subdivided particles made available by the invention, whether by outright fragmentation or by a combination of disintegration and crushing, may have a particle size below 1000 microns, say from 1000 to 1 micron, and even below 1 micron. Fractions of narrow particle size ranges are obtainable. In some cases, as where granules in bead form are subjected to the process, the resulting particles, after removal of the occluded crystals, may be in the form of a shell, or a structure comprising two or more concentric shells which are brittle and relatively fragile. The thickness of the shell walls is found to depend on the prior heat treatment of the beads, the particular crystallizable and disintegrating liquids employed, and the contact conditions.

The invention may be illustrated by the following examples.

EXAMPLE 1

An amount of 89.7 g. of a commercial desiccant, comprising silica made up in the form of 4–10 mesh beads, were heated at 320° F. for about 17 hours to remove moisture. After cooling to room temperature, the beads were placed in 63.8 g. of melted paraffin wax maintained at a temperature of 275° F. The wax had a melting point of 138–140° F. The beads imbibed the melted wax and sank to the bottom thereof. After 1 hour the melted wax was decanted from the beads, and the latter placed on a paper towel and patted to remove excess wax from the surfaces thereof. After cooling to room temperature, the "loaded" beads containing wax crystals had little tendency to stick to each other. The beads were then added to water at room temperature, and it was noticed that the beads increased in volume and became very soft; simultaneously with these effects, a white translucent sol comprising wax, silica and water, was formed. When the sol was dried at 175° F., a dry powder was left.

EXAMPLE 2

About 16.0 g. of a commercial cracking catalyst containing some crystalline aluminosilicate powder, comprising beads of 4 to 6 mesh (particle diameter of 3.4 to 4.8 mm.), previously heated at 1000° F. to remove moisture, were placed in a flask and 33.8 g. of cyclohexane added. The latter had a freezing point of 44° F. and a boiling point of 179° F. After 30 minutes of contact, the beads were separated from the mixture by pipetting out the excess cyclohexane. About 6.08 g. of the liquid was occluded within the pores of the beads. The beads were then cooled in an ice pack for 30 minutes to crystallize the cyclohexane, and then 76 g. of water at 34° F. was added to the cold beads and allowed to remain in contact therewith for about 2 hours while surrounding the mixture by ice and water. The mixture was then warmed to 80° F. Water and cyclohexane were removed by evaporation at 200° F. and then at 310° F. The mixture was finally calcined at 1050° F. After calcination, the granules, which weighed 16.08 g., were sieved through standard sieves with the following results:

| Mesh of Sieve | Diameter of Openings, in mm. | Wt. Percent on— |
|---|---|---|
| 6 | 3.36 | 23.5 |
| 10 | 2.00 | 21.6 |
| 20 | 0.84 | 16.5 |
| 60 | 0.25 | 31.6 |
| 100 | 0.149 | 4.3 |
| Thru 100 | | 2.5 |
| | | 100.0 |

As is apparent, a major portion of the beads was reduced in size.

EXAMPLE 3

The same beads used in Example 2, in an amount of 60.0 g., were placed in 150 g. of molten sulfur heated to 277° F., allowed to remain for 2 hours, after which the excess sulfur was decanted and pipetted from the mixture. The remaining beads contained 46.9 g. of sulfur or 0.78 g. of sulfur per g. of beads. After cooling to room temperature, the sulfur occluded in the beads crystallized. Then 23.1 g. of the beads containing sulfur crystals were placed in 100 g. of water heated to 198° F. (sulfur melts at 235° F.). The beads quickly disintegrated to form a voluminous slurry. After evaporation of water from the mixture by heating at 200° F., the product was a dry powder weighing 23.4 g. This was sieved with the following results:

| Mesh of Sieve | Diameter of Openings, in mm. | Wt. Percent on— |
|---|---|---|
| 20 | 0.84 | 0.1 |
| 60 | 0.25 | 9.9 |
| 100 | 0.149 | 11.7 |
| Thru 100 | | 78.3 |
| | | 100.0 |

The sieved fractions were then combined and calcined in air at 1500° F. to remove occluded sulfur. After cooling, the calcined powder was sieved again with the following results:

| Mesh of Sieve | Diameter of Openings, in mm. | Wt. Percent on— |
|---|---|---|
| 20 | 0.84 | None |
| 60 | 0.25 | 13.3 |
| 100 | 0.149 | 14.3 |
| 140 | 0.105 | 16.8 |
| 200 | 0.074 | 16.5 |
| 325 | 0.44 | 26.5 |
| Thru 325 | | 12.6 |
| | | 100.0 |

It is evident that granules of small mesh were produced from the whole beads without application of mechanical energy.

EXAMPLE 4

Beads of the same kind used in Example 2 were placed in molten biphenyl, melting point 158° F., at 208° F. and allowed to remain one hour after which the excess biphenyl was decanted and then further removed by contact with absorbent paper. The beads were cooled and found to contain 0.43 g. of biphenyl crystals per g. of beads. The beads were divided into 3 portions, one of which was placed in water at 34° F., a second in water at 81° F., and a third in water at 133° F., each portion being allowed to remain in the water for one hour. At the higher temperatures the beads puffed up and disintegrated rapidly. Each portion of beads was dried at 200° F., and again at 320° F., followed by calcining in air at 1000° F. for 1 to 2 hours to remove all the biphenyl. Each portion of beads, now powdered, was sieved with the following results:

| Temp., ° F. of Water Contact | Wt. Percent on Mesh Size | | | | | | | |
|---|---|---|---|---|---|---|---|---|
| | 10 | 20 | 60 | 100 | 140 | 200 | 325 | Thru 325 |
| 34 | 4.6 | 2.0 | 4.1 | 7.7 | 8.1 | 18.4 | 35.9 | 19.2 |
| 81 | 2.0 | 1.8 | 8.2 | 16.2 | 14.3 | 20.5 | 25.1 | 11.9 |
| 133 | 3.0 | 10.0 | 28.0 | 25.0 | 13.7 | 8.3 | 9.4 | 2.6 |

As may be evident, the mesh size distributions of the granules produced are a function of water contact temperature.

EXAMPLE 5

About 179.7 g. of white silica-alumina commercial bead catalyst of 4 to 6 mesh were added to 136.1 g. of wax, melting between 138 and 140° F., at 185° F. and allowed to remain for 17 hours at the stated temperature. The excess wax was decanted from the beads and the "loaded" hot beads were placed on paper towels to remove excess molten wax from the exterior surfaces. It was found that the beads occluded 64.4 g. of wax or 0.36 g. per g. of beads. When cooled to about 80° F. and placed in water at this temperature, the beads slowly formed a white sol comprising water, wax, and fragments of the silica-alumina. The amount of sol increased with time, and it was noted that individual beads formed thin-walled concentric shells. After removing the sol by decanting, the remaining shells were dried at 200° F., leaving a mixture of very fragile concentric shells and broken fragments.

EXAMPLE 6

Catalyst beads of the kind used in Example 2 were calcined 17 hours in air at 1050° F. to remove moisture. They were then placed in molten biphenyl at 205° F. for one hour, excess biphenyl was decanted, and the "loaded" beads were dried on a paper towel. They contained 0.52 g. of biphenyl per g. of beads. To 19.8 g. of the loaded beads, 100 g. of water at 80° F. were added and the mixture held at 80° F. for 1 hour. A slurry was produced which was dried by first heating on a steam bed, then at 320° F., and then at 1000° F. The resulting powder was sieved and the data obtained was compared with that from a similar sieving of a commercial fluidized catalyst.

| | Wt. Percent on Mesh Size | | | | |
|---|---|---|---|---|---|
| | 100 | 140 | 200 | 325 | Thru 325 |
| After Biphenyl and Water Contact | 2.2 | 2.6 | 19.6 | 51.9 | 23.7 |
| Commercial Fluid Catalyst | 0.6 | 4.3 | 16.2 | 44.7 | 34.2 |

It is apparent from these data that a catalyst of the fluidized type can be prepared from beads of 4 to 6 mesh without employing grinding or other mechanical pulverization steps.

EXAMPLE 7

Samples of the bead catalyst of Example 2 were prepared with occluded biphenyl by the technique of Example 4 so that the beads contained about 0.43 g. of biphenyl per g. of bead. The loaded beads were then contacted at about 80° F. for 1 to 18 hours with (a) water, (b) methanol, and (c) cyclohexane. The beads were dried at 210° F., then at 320° F., and finally were calcined in air at 1050° F. The samples were then sieved and the following data were obtained:

| Biphenyl-Loaded Beads Contacted With— | Wt. Percent on Mesh Size | | | | | | | | |
|---|---|---|---|---|---|---|---|---|---|
| | 6 | 10 | 20 | 60 | 100 | 140 | 200 | 325 | Thru 325 |
| Water | | 2.0 | 1.8 | 8.2 | 16.2 | 14.3 | 20.5 | 25.1 | 11.9 |
| Methanol | 10.2 | 7.2 | 8.9 | 23.9 | 17.9 | 15.2 | 7.8 | 7.6 | 1.3 |
| Cyclohexane | 67.4 | 10.7 | 8.6 | 9.5 | 2.6 | 1.2 | | | |

As may be seen a variety of particle sizes are obtainable by varying the liquid producing the disintegration.

EXAMPLE 8

The bead catalyst of Example 2 was "loaded" with a number of different crystals, identified below, and then brought in contact with water at temperatures below the freezing point of the occluded crystals. The most extensive disintegrations were obtained with crystals which were insoluble or only slightly soluble in water. In the following table all of the crystals, when brought in contact with water, caused extensive disintegration of the beads.

| Crystals occluded | Melting points of crystals, ° F. | Grams of occluded crystals per grams of catalyst | Solubility in water |
|---|---|---|---|
| Cyclohexane | 44 | 0.37 | Insoluble. |
| P-xylene | 54 | 0.42 | Do. |
| P-dichlorobenzene | 127 | 0.50 | Very slightly soluble. |
| Naphthalene | 176 | 0.42 | Do. |
| Triphenylmethane | 198 | 0.46 | Slightly soluble. |
| Iodine | 237 | 2.33 | Do. |
| Phthalic anhydride | 268 | 0.66 | Very slightly soluble. |
| Dimethyl terephthalate | 284 | 0.49 | Do. |

Besides the advantages noted, the invention is of particular value for preparing small amounts of subdivided particles, such as may be required on a laboratory or pilot plant scale, without necessity for mechanical grinding equipment. It is also apparent that the process may be performed in a minimum time. Furthermore, the process is applicable to the disintegration of many solids of varying degrees of susceptibility, for as noted, where a solid tends to undergo cracking rather than fragmentation, modifications of the process are provided to help reach a desired result.

It will be understood that the invention is capable of obvious variations without departing from its scope.

In the light of the foregoing description, the following is claimed:

1. In a process for producing subdivided solid particles of a size below 1000 microns from porous, substantially moisture-free solid granules of a size in the range of 1 to 25 mm., the steps comprising mixing said granules with a substantially pure liquid characterized (1) by having a substantially sharp melting point, (2) by contracting in volume during cooling, (3) by undergoing a substantial contraction in volume during crystallization, and (4) by being stable at the temperatures employed in said process, the temperature of said granules and said liquid during the mixing step being intermediate the freezing and boiling points of said liquid, occluding in the pores of said granules a quantity of liquid as a result of said mixing step, separating the granules from the mixture and removing any excess liquid from surfaces of the granules, cooling the granules to a temperature below the freezing point of the occluded liquid, thereby forming solid crystals of said liquid in the granules, bringing the granules into contact with a second liquid at a temperature below said freezing point, and maintaining said contact for a time sufficient for said granules to enter upon a process of disintegration, said disintegration process ranging from the appearance of cracks in the granules to outright fragmentation thereof with production of said subdivided solid particles, removing said liquid and said crystals, and recovering said disintegrated granules.

2. Process of claim 1 in which said second liquid has substantially no solubility for said occluded crystals.

3. Process of claim 1 in which said liquid and said crystals are removed by solvent extraction.

4. Process of claim 1 in which said second liquid is water.

5. Process of claim 1 in which said occluded crystals are also subjected to said disintegration process.

6. Process of claim 1 wherein said porous granules have a substantially homogeneous structure, a port volume of about 5 to 70% thereof, pore diameters in the range of about 3 Angstroms to 100 microns, and a nominal diameter in the range of 1 to 25 mm.

7. Process of claim 1 in which said contact time varies from a fraction of a minute to about two days.

8. Process of claim 1 in which said granules are fragmented into subdivided solid particles of a size below 100 microns.

9. Process of claim 1 in which said granules are disintegrated with the production of cracked granules, recovering the latter, and subjecting the same to mechanical crushing under relatively mild conditions to produce said subdivided solid particles.

10. In a process for producing subdivided solid particles from porous, substantially moisture-free granules, the steps comprising mixing said granules with a liquid characterized by contracting in volume during cooling and crystallization, the temperature of said granules and said liquid during the mixing step being intermediate the freezing and boiling points of said liquid, occluding in the pores of said granules a quantity of liquid as a result of said mixing step, separating the granules from the mixture and removing any excess liquid from surfaces of the granules, cooling the granules to a temperature below the freezing point of the occluded liquid, thereby forming solid crystals of said liquid in the granules, bringing the granules into contact with a disintegrating liquid at a temperature below said freezing point, and maintaining said contact for a time sufficient for said granules to enter upon a process of disintegration, said disintegration process ranging from the appearance of cracks in the granules to fragmentation thereof into said subdivided particles.

References Cited

UNITED STATES PATENTS

| 2,079,514 | 5/1937 | Leetz | 241—1 |
| 2,453,557 | 11/1948 | Voet | 241—23 X |
| 2,848,313 | 8/1958 | Takahashi et al. | 241—1 X |

WILLIAM W. DYER, Jr., *Primary Examiner.*

FRANK T. YOST, *Assistant Examiner.*